United States Patent
Bodtker et al.

[11] Patent Number: 5,855,142
[45] Date of Patent: Jan. 5, 1999

[54] RETAINER FOR BALL SCREW CROSSOVER TUBE

[75] Inventors: Joen Christen Bodtker, Flint; Walter Edward Fellows, Birch Run, both of Mich.

[73] Assignee: General Motors Corporation, Detroit, Mich.

[21] Appl. No.: 766,844

[22] Filed: Dec. 13, 1996

[51] Int. Cl.$^6$ .................................................. F16H 55/17
[52] U.S. Cl. ................................................ 74/459; 74/499
[58] Field of Search ........................................ 74/459, 499

[56] References Cited

U.S. PATENT DOCUMENTS

| | | | |
|---|---|---|---|
| 2,380,662 | 7/1945 | Means, Jr. | 74/459 |
| 2,917,938 | 12/1959 | Folkerts | 74/499 |
| 3,022,772 | 2/1962 | Zeigler et al. | |
| 3,176,535 | 4/1965 | Rowland | 74/459 |
| 3,206,995 | 9/1965 | Bohnhoff | 74/459 |
| 3,327,551 | 6/1967 | Prueter | 74/424.8 |
| 3,805,634 | 4/1974 | White | 74/441 |
| 4,235,122 | 11/1980 | Walter | 74/459 X |
| 4,342,235 | 8/1982 | Benton | 74/424.8 R |
| 4,750,378 | 6/1988 | Sheppard | 74/459 X |
| 5,211,069 | 5/1993 | Wada et al. | 74/499 X |
| 5,303,607 | 4/1994 | Katahira | 74/459 |
| 5,341,701 | 8/1994 | Krom et al. | 74/499 |

*Primary Examiner*—Charles A. Marmor
*Assistant Examiner*—David Fenstermacher
*Attorney, Agent, or Firm*—Saul Schwartz; Dean L. Ellis

[57] ABSTRACT

A retainer for a crossover tube of a ball screw between a rack piston and a worm shaft of a motor vehicle power steering gear. The ball screw includes a helical passage between the rack piston and the worm shaft, a U-shaped crossover tube on the rack piston, and a plurality of bearing balls which roll in a ball circuit defined by the helical passage and the crossover tube. The crossover tube retainer is a molded plastic arch straddling a linear segment of the crossover tube having a web bridging the gap between the crossover tube and the rack piston bore. The thrust of the bearing balls urging dislodgment of the crossover tube from the rack piston is reacted against the rack piston bore through the web of the molded plastic arch across a bearing surface of the web having a contour complementary to the contour of the rack piston bore above the molded plastic arch. A pair of side walls of the molded plastic arch flare laterally outward in opposite directions from a throat of the molded plastic arch so that the retainer is compatible with ball screws having different helical lead angles.

2 Claims, 3 Drawing Sheets

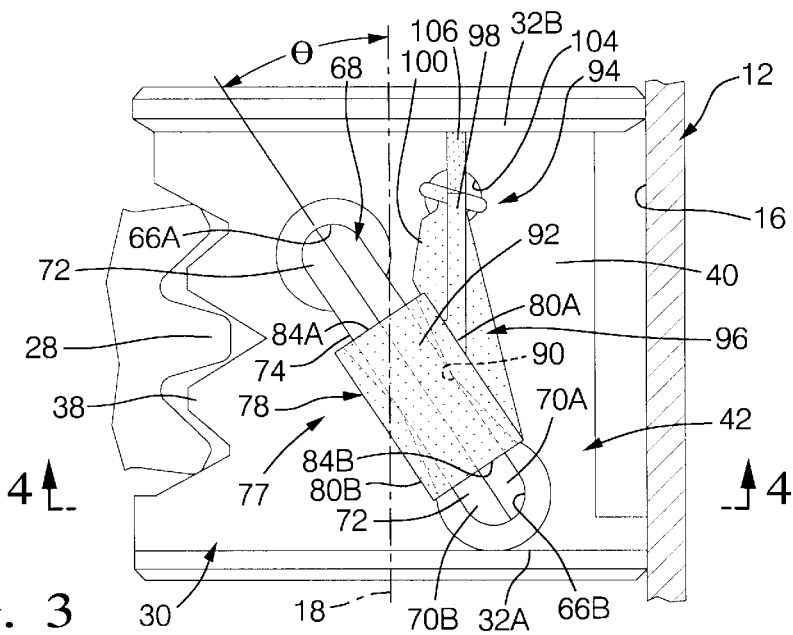
FIG. 3
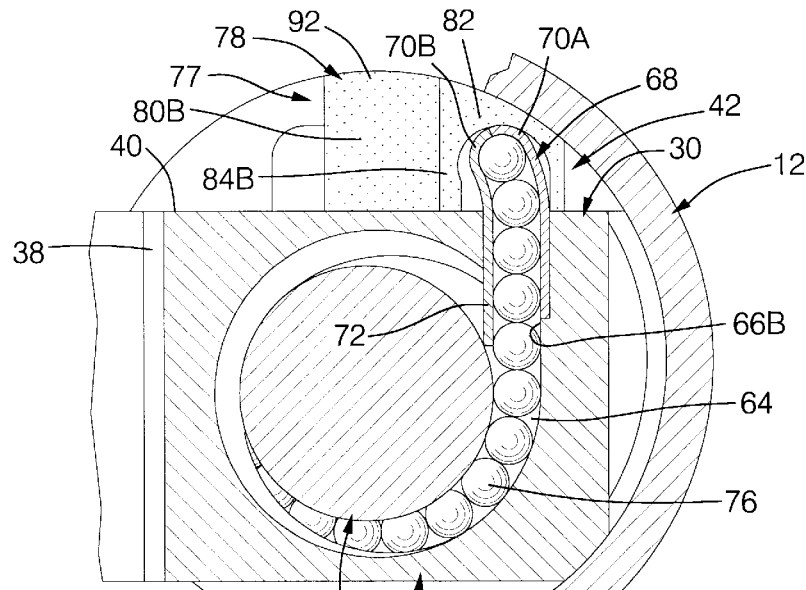
FIG. 4
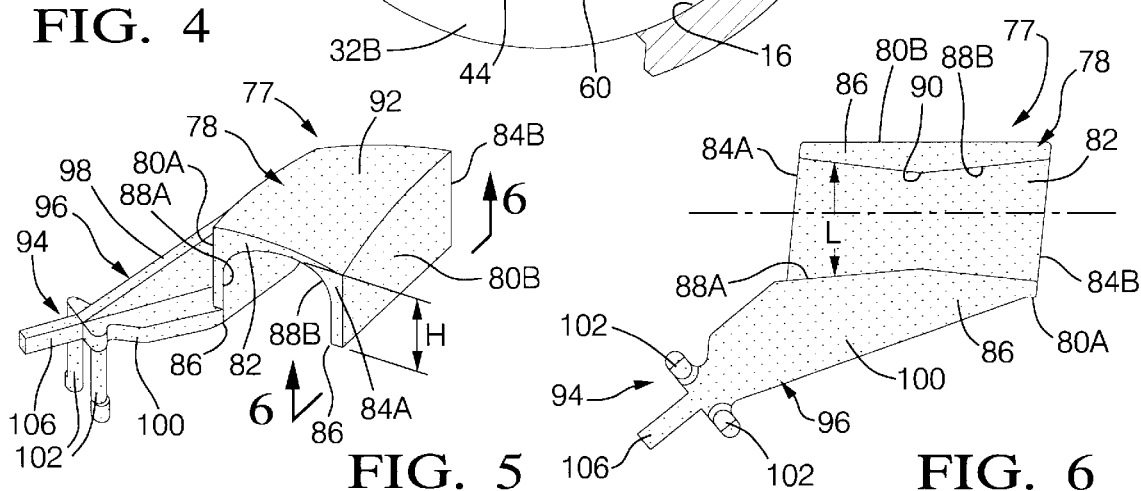
FIG. 5
FIG. 6

RETAINER FOR BALL SCREW CROSSOVER TUBE

TECHNICAL FIELD

This invention relates to a recirculating ball screw in a motor vehicle power steering gear.

BACKGROUND OF THE INVENTION

U.S. Pat. No. 3,022,772, issued Feb. 27, 1962 and assigned to the assignee of this invention, describes a motor vehicle power steering gear including a housing, a pitman shaft linked to steered wheels of the motor vehicle, a sector gear on the pitman shaft, a worm shaft linked to a manual steering wheel of the motor vehicle, a rack piston having a rack gear thereon meshing with the sector gear on the pitman shaft, and a ball screw between the rack piston and the worm shaft which converts rotation of the worm shaft into linear translation of the rack piston in a bore in the steering gear housing. The ball screw consists of a helical passage between the rack piston and the worm shaft, a U-shaped crossover tube on the rack piston which cooperates with the helical passage in defining an endless ball circuit, and a plurality of bearing balls which roll in the ball circuit concurrent with rotation of the worm shaft relative to the rack piston. A metal strap clamped to the rack piston retains the crossover tube on the rack piston against thrust induced by the bearing balls urging dislodgment of the crossover tube from the rack piston. A crossover tube retainer according to this invention is a novel alternative to the metal strap described in the aforesaid U.S. Pat. No. 3,022,772.

SUMMARY OF THE INVENTION

This invention is a new and improved retainer for a crossover tube of a ball screw between a rack piston and a worm shaft of a motor vehicle power steering gear. The ball screw includes a helical passage between the rack piston and the worm shaft, a U-shaped crossover tube on the rack piston in a cavity of the latter facing the rack piston bore in a housing of the steering gear which cooperates with the helical passage in defining an endless ball circuit, and a plurality of bearing balls which roll in the ball circuit concurrent with rotation of the worm shaft relative to the rack piston. The crossover tube retainer according to this invention is a molded plastic arch which straddles a linear segment of the crossover tube with a web of the arch bridging the gap between the latter and the rack piston bore in the steering gear housing. The thrust of the bearing balls urging dislodgment of the crossover tube from the rack piston is reacted against the rack piston bore across a bearing surface on the web of the molded plastic arch complementary to and bearing flush against the rack piston bore. A pair of side walls of the molded plastic arch on opposite sides of the linear segment of the crossover tube flare laterally outward in opposite directions from a throat of the molded plastic arch so that the retainer is compatible with ball screws having helical passages with different helical lead angles. In a preferred embodiment, a secondary retention means prevents dislodgment of the molded plastic arch from the rack piston outside of the steering gear housing.

BRIEF DESCRIPTION OF THE DRAWINGS

FIG. 3 is a sectional view taken generally along the plane indicated by lines 3—3 in FIG. 2;

FIG. 4 is a sectional view taken generally along the plane indicated by lines 4—4 in FIG. 3;

FIG. 5 is a perspective view of a crossover tube retainer according to this invention; and FIG. 6 is a view taken generally along the plane indicated by lines 6—6 in FIG. 5.

DESCRIPTION OF THE PREFERRED EMBODIMENT

Figure 1:
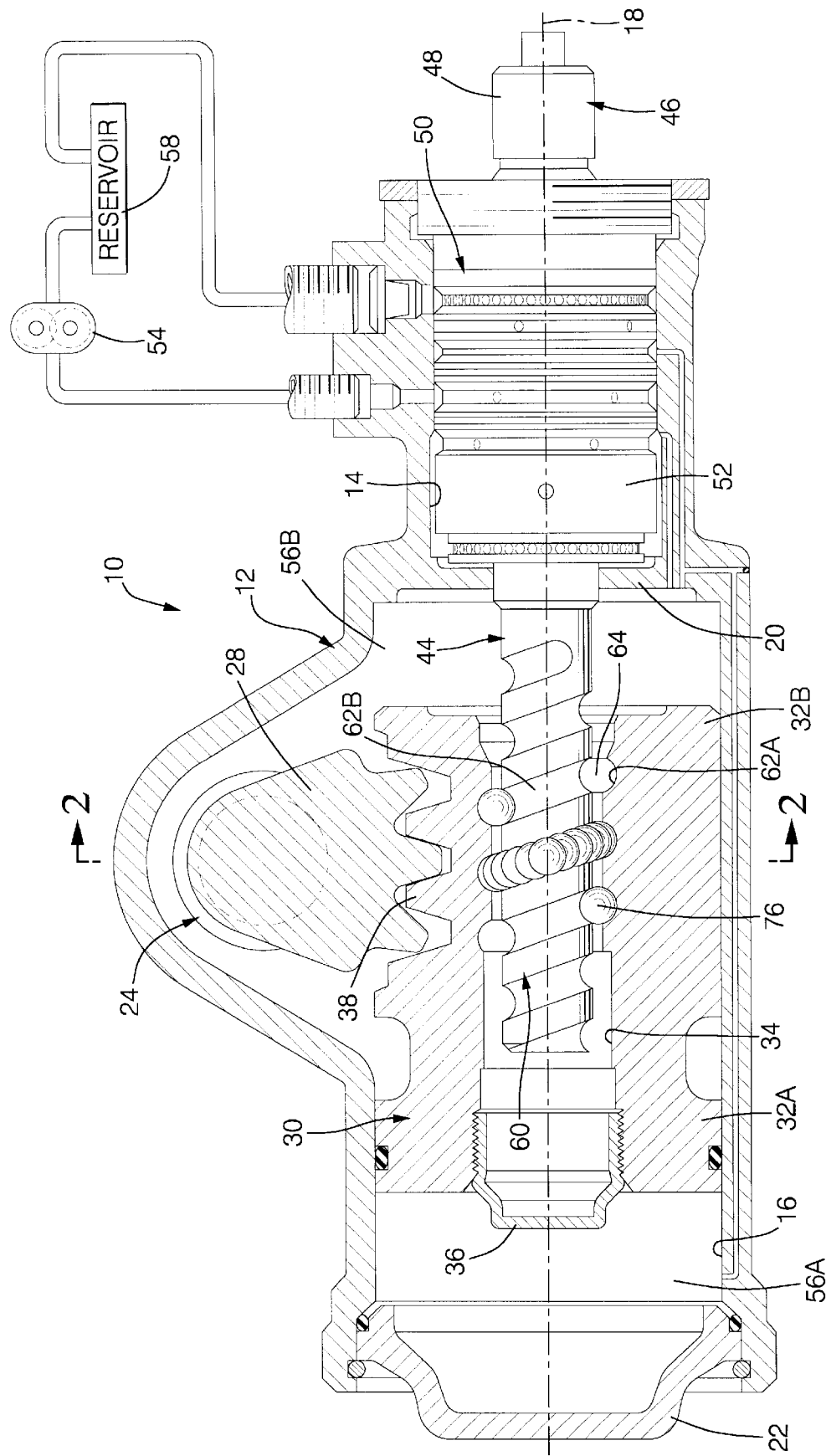
FIG. 1 is a sectional view of a motor vehicle power steering gear having a ball screw with a crossover tube retainer according to this invention.
Figure 2:
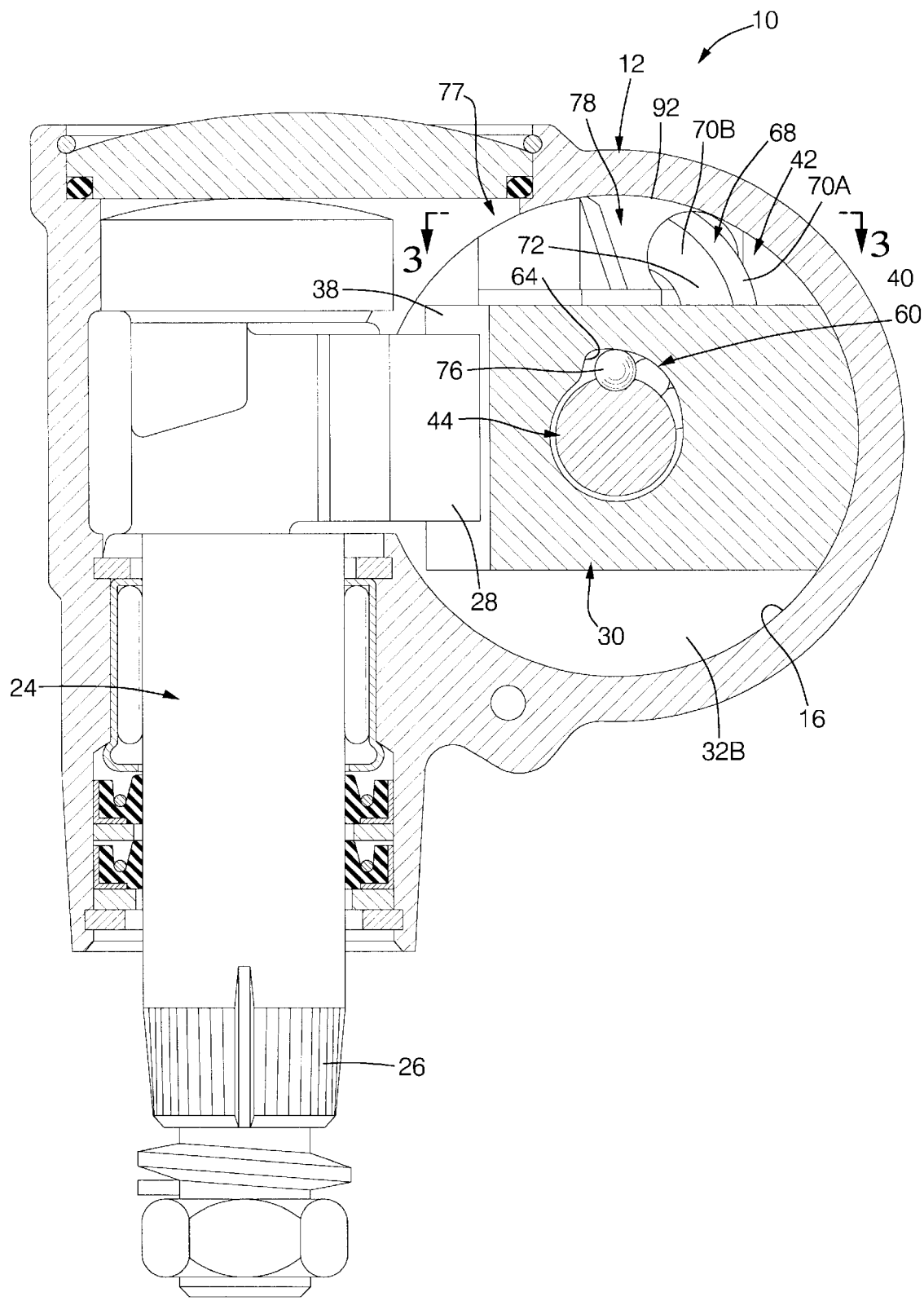
FIG. 2 is a sectional view taken generally along the plane indicated by lines 2—2 in FIG. 1.

Referring to FIGS. 1–2, a motor vehicle power steering gear 10, substantially the same as the power steering gear described in the aforesaid U.S. Pat. No. 3,022,772, includes a housing 12 having a valve bore 14 and a rack piston bore 16 on a common centerline 18 of the housing separated by an integral web 20 of the housing. The end of the rack piston bore 16 opposite the web 20 is sealed closed by a cover 22. A pitman shaft 24 of the steering gear 10 is rotatably supported on the housing 12 with a splined end 26 thereof outside of the housing linked to steered wheels, not shown, of the motor vehicle and a sector gear 28 thereof inside of the housing 12.

A rack piston 30 of the steering gear 10 has a pair of circular lands 32A, 32B at its opposite ends slideable in the rack piston bore 16 in the housing 12, a longitudinal bore 34, and a cap 36 which seals closed the longitudinal bore 34. A rack gear 38 on the rack piston meshes with the sector gear 28 and cooperates therewith in converting linear translation of the rack piston in the rack piston bore 16 in the direction of the centerline 18 into rotation of the pitman shaft. A planar land 40 of the rack piston between the circular lands 32A, 32B cooperates with the circular lands in defining a cavity 42 of the rack piston facing the rack piston bore 16.

A worm shaft 44 of the steering gear in the longitudinal bore 34 in the rack piston is rotatable about the centerline 18. An input shaft 46 of the steering gear 10 has an end 48 connected to a manual steering wheel, not shown, of the motor vehicle and an opposite end, not shown, linked to the worm shaft 44 by a torsion bar, not shown, so that the input shaft is rotatable with the worm shaft and relative thereto through a limited angle. A valve 50 of the steering gear 10 includes a valve body 52 rotatable in the valve bore 14 with the worm shaft 44 and a valve spool, not shown, on the input shaft 46 inside the valve body. The valve body and valve spool cooperate as described in detail in the aforesaid U.S. Pat. No. 3,022,772 to connect a pump 54 to either one of a pair of fluid motor working chambers 56A, 56B on opposite sides of the rack piston 30 and a reservoir 58 to the other of the working chambers in response to relative rotation between the valve spool and the valve body.

A ball screw 60 between the worm shaft 44 and the rack piston 30 converts rotation of the worm shaft into linear translation of the rack piston in the direction of the centerline 18 of the housing 12. The ball screw 60 includes a pair of helical grooves 62A, 62B in the longitudinal bore 34 of the rack piston and on the worm shaft 44, respectively, which face each other and cooperate in defining a helical passage 64 between the rack piston and the worm shaft. A pair of linear passages 66A, 66B in the rack piston at opposite ends of the helical passage 64 intersect the planar land 40 of the rack piston 30 perpendicular to the planar land.

A U-shaped crossover tube 68 of the ball screw 60 consisting of a pair of facing shells 70A, 70B includes a pair of depending arms 72 in respective ones of the linear passages 66A, 66B and a linear segment 74, FIG. 3, between the depending arms parallel to the planar land 40. The crossover tube 68 cooperates with the helical passage 64 in defining an endless ball circuit in which is disposed a plurality of bearing balls 76. The bearing balls 76 roll back and forth in the endless ball circuit concurrent with rotation of the worm shaft relative to the rack piston. A crossover tube retainer 77 according to this invention in the cavity 42 prevents dislodgment of the crossover tube 68 from the rack piston.

Referring to FIGS. 2–6, the crossover tube retainer 77 is an elongated, molded plastic arch 78 having a pair of side walls 80A, 80B and an integral web 82 between the side walls. Each of the side walls 80A, 80B and the web 82 extend between a pair of opposite ends 84A, 84B of the elongated arch. A height dimension "H" of the elongated arch, FIG. 5, from a foot 86 of each side wall to the internal apogee of the, web 82 is constant from the end 84A to the end 84B of the elongated arch. A lateral dimension "L" of the elongated arch 78, FIG. 6, between a pair of inward facing surfaces 88A, 88B of the side walls 80A, 80B is maximum at the opposite ends 84A, 84B of the elongated arch and decreases to a minimum at a throat 90 of the elongated arch generally midway between the opposite ends 84A, 84B. The lateral dimension "L" at the throat 90 and the height dimension "H" correspond closely to the diameter of the linear segment 74 of the crossover tube.

The elongated arch 78 straddles the linear segment 74 of the crossover tube 68 with the side walls 80A, 80B and the web 82, respectively, on opposite sides of and above the linear segment and with the feet 86 of the side walls seated on the planar land 40 of the rack piston. In that position of the elongated arch, the linear segment 74 of the crossover tube is closely captured between the side walls 80A, 80B and the web 82 at the throat 90. A surface of the web 82 on the opposite side thereof from the linear segment 74 of the crossover tube defines a bearing surface 92 of the retainer 77 having a contour complementary to the contour of the rack piston bore 16 in the steering gear housing above the elongated arch 78. The elongated arch 78 is captured in the cavity 42 of the rack piston between the planar land 40 and the rack piston bore 16 with the feet 86 on the planar land 40, the bearing surface 92 flush against the rack piston bore 16, and the web 82 spanning the gap between the rack piston bore 16 and the linear segment 74 of the crossover tube.

When an operator steers the motor vehicle by turning the input shaft 46 of the steering gear, the worm shaft 44 rotates relative to the rack piston 30 and causes the bearing balls 76 to circulate in the endless circuit defined by the helical passage 64 and the crossover tube 68. Concurrently, the rack piston 30 translates linearly in the bore in the direction of the centerline 18 of the steering gear housing, causing the circular lands 32A, 32B of the rack piston and the bearing surface 92 of the crossover tube retainer 77 to slide relative to the rack piston bore 16. As the bearing balls circulate, they induce thrust on the crossover tube 68 urging dislodgment from the rack piston. The thrust of the bearing balls on the crossover tube is reacted against the rack piston bore 16 of the steering gear housing through web 82 of the elongated arch 78 and across the surface area of the bearing surface 92 to prevent dislodgment of the crossover tube from the rack piston.

As seen best in FIGS. 3, 5 and 6, the crossover tube retainer 77 has a secondary retention means 94 to prevent dislodgment of the elongated arch 78 from the rack piston outside of the steering gear housing 12. The secondary retention means 94 includes an outrigger 96 integral with the side wall 80A of the elongated arch 78 having a reinforcing web 98 and an integral base 100 which seats against the planar land 40 of the rack piston. A pair of integral, resilient hooks 102 depend perpendicular to the base 100 of the outrigger 96 into a bore 104 in the rack piston perpendicular to the planar land 40. Each of the hooks 102 has a barb which seats behind a shoulder, not shown, around the bore 104 to couple the elongated arch to the rack piston so that the crossover tube 68 and the bearing balls 76 do not become separated from the rack piston prior to installation of the latter into the rack piston bore 16. Alternately, instead of the hooks 102, the outrigger may have a simple cylindrical pin which is interference fitted in a bore in the planar land 40 such as a screw-threaded bore formerly used for a fastener for a conventional crossover tube retainer such as described in the aforesaid U.S. Pat. No. 3,022,772. A tab 106 integral with the outrigger 96 extends beyond the bore 104 and seats against the planar land 40 to prevent tipping of the crossover tube retainer relative to the planar land.

The crossover tube retainer 77 is compatible with ball screws having helical lead angles different from the helical lead angle of the helical passage 64 of the ball screw 60. That is, with lateral clearance existing between the linear segment 74 of the crossover tube and the side walls 80A, 80B of the elongated arch 78 at the opposite ends 84A, 84B of the latter, FIG. 3, but not at the throat 90, cross over tubes having linear segments at different angles θ, FIG. 3, relative to the centerline 18 corresponding to different helical lead angles of the ball screw may be accommodated between the side walls 80A, 80B. Accordingly, manufacturing economy is achieved through use of a common crossover tube retainer 77 for multiple ball screw applications.

We claim:

1. A retainer for a ball crossover tube for a rack piston which is disposed in a rack piston bore in a housing of a motor vehicle power steering gear and which is engaged by balls with a worm shaft of the power steering gear, the rack piston having a planar land in a cavity of the rack piston facing the rack piston bore, the crossover tube being disposed in said cavity with a linear segment of the crossover tube parallel to the planar land, said crossover tube retainer comprising a molded plastic arch straddling said linear segment of said crossover tube, said arch including a pair of side walls on opposite sides of said linear segment and a web integral with said pair of side walls over said linear segment, a foot on each of said side walls of said molded plastic arch adapted to be seated on the planar land of the rack piston, a bearing surface on said web having a contour complementary to the contour of the rack piston bore above said molded plastic arch, said bearing surface adapted to be seated flush against the rack piston bore so that said molded plastic arch is captured between the planar land of the rack piston and the rack piston bore and so that thrust on said crossover tube urging dislodgment thereof from the rack piston is reacted through said web of said molded plastic arch to the rack piston bore, a throat on said molded plastic arch substantially midway between a pair of opposite ends thereof characterized by a lateral dimension of said molded plastic arch between a pair of surfaces of said sides walls thereof facing each other on opposite sides of said linear segment of said crossover tube having a maximum magnitude at said pair of opposite ends of said molded plastic arch and a minimum magnitude at said throat, and a secondary retention means on said molded plastic arch engageable with the rack piston and operative to prevent dislodgment of said molded plastic arch from the rack piston when the rack piston is outside of the rack piston bore.

2. The crossover tube retainer recited in claim 1 wherein said secondary retention means comprises:

an outrigger integral with said molded plastic arch, and a pair of hooks on said outrigger projecting into a bore in said rack piston perpendicular to said planar land and engageable behind a shoulder of said rack piston around said bore to prevent dislodgment of said molded plastic arch from said rack piston when said rack piston is outside of said rack piston bore.

* * * * *